United States Patent [19]
Ishii et al.

[11] Patent Number: 4,721,744
[45] Date of Patent: * Jan. 26, 1988

[54] STABILIZED POLYURETHANE COMPOSITIONS

[75] Inventors: Tamaki Ishii, Suita; Shinichi Yachigo, Toyonaka; Manji Sasaki, Ibaraki; Haruki Okamura, Osaka; Masahisa Shionoya, Izumi, all of Japan

[73] Assignee: Sumitomo Chemical Company, Limited, Osaka, Japan

[ * ] Notice: The portion of the term of this patent subsequent to Mar. 18, 2003 has been disclaimed.

[21] Appl. No.: 846,050

[22] Filed: Mar. 31, 1986

[30] Foreign Application Priority Data

Apr. 4, 1985 [JP] Japan ................... 60-71442

[51] Int. Cl.⁴ .................... C08K 5/34; C08K 5/49
[52] U.S. Cl. .................... 524/91; 524/108; 524/103; 524/102; 524/100; 524/120
[58] Field of Search ............ 524/108, 91, 102, 100, 524/103

[56] References Cited

U.S. PATENT DOCUMENTS

4,507,417 3/1985 Ishii et al. ............... 524/108
4,576,734 3/1986 Ishii et al. ............... 524/108

FOREIGN PATENT DOCUMENTS

155847 9/1985 European Pat. Off. ........... 524/108
25826 2/1984 Japan.

OTHER PUBLICATIONS

Chemical Abstracts, 101, vol. 2, No. 8213w.

Primary Examiner—John Kight
Assistant Examiner—Kriellion Morgan
Attorney, Agent, or Firm—Wenderoth, Lind & Ponack

[57] ABSTRACT

Polyurethanes are stabilized against yellowing by incorporating a phenolic type compound represented by the general formula (I)

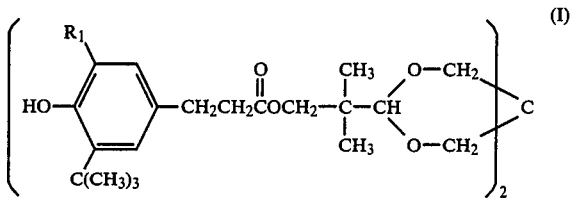

wherein $R_1$ represents a $C_1$-$C_3$ alkyl group and at least one member selected from a benzotriazole type light stabilizer and a hindered amine type stabilizer.

4 Claims, No Drawings

STABILIZED POLYURETHANE COMPOSITIONS

The present invention relates to stabilized polyurethane compositions. More particularly, it relates to polyurethane compositions stabilized against yellowing caused by the action of sunlight, nitrogen oxides gases, etc.

Polyurethanes are generally obtained by polyaddition reaction of polyisocyanate with a polyhydroxy compound, and they are used, because of their excellent elastic physical properties, in many fields such as fibers, films, foams, paints, adhesives, etc. Particularly, polyurethanes composed mainly of aromatic isocyanates such as tolylenediisocyanate, diphenylmethane diisocyanate, etc. find wide applications for their high degree of rubber elasticity.

In polyurethanes made of these aromatic isocyanates, however, yellowing is caused by the action of sunlight, nitrogen oxide gases, etc., and therefore, various kinds of method for preventing yellowing such as use of aliphatic isocyanates (e.g. hexamethylene diisocyanate), improvement in coupling agents, etc. have so far been tried. But, these methods were not satisfactory because polyurethanes produced by them tended to be inferior in the essential properties of an elastic body such as tensile property, thermal resistance, etc. Also, it has hitherto been proposed to add various stabilizers, for example phenolic type, sulfur-containing or phosphite type antioxidants and benzophenone type, benzotriazole type, salicylate type, acrylonitrile type, Ni type or hindered amine type light stabilizers, alone or in combination to polyurethanes. But, these methods were not also quite satisfactory in terms of yellowing due to sunlight, nitrogen oxide gases, etc. Among these stabilizers are those which are effective to prevent yellowing due to sunlight, but they are not effective to prevent yellowing due to nitrogen oxide gases. Thus, there were few stabilizers effective to prevent both yellowing due to sunlight and that due to nitrogen oxide gases.

The present inventors extensively studied to solve these problems, and as a result, found that, by incorporating a particular phenolic type compound in polyurethanes, the resistance of the polyurethanes to yellowing due to nitrogen oxide gases, sunlight, etc. can remarkably be improved even when they are used alone, and also that the resistance can be further improved when at least one member selected from benzotriazole type light stabilizers and hindered amine type ones is used together with the phenolic type compound. The present inventors thus completed the present invention.

According to the present invention, there are provided polyurethane compositions remarkably improved in resistance to yellowing which comprises adding to polyurethanes a phenolic type compound represented by the general formula (I),

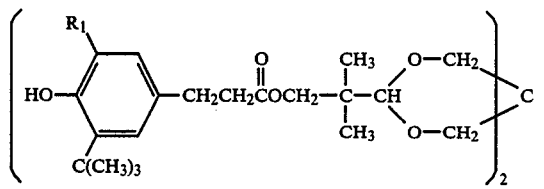

wherein $R_1$ represents a $C_1-C_3$ alkyl group, in amounts of 0.05 to 10% by weight based on polyurethanes and at least one member selected from benzotriazole type light stabilizers and hindered amine type ones in amounts of 0 to 10% by weight based on polyurethanes.

The phenolic type compound of the general formula (I) used in the present invention can be produced by esterification of 3-(3-alkyl-5-tert-butyl-4-hydroxyphenyl)propionic acid or its acid halide or acid anhydride with 3,9-bis(2-hydroxy-1,1-dimethylethyl)-2,4,8,10-tetraoxaspiro[5.5]undecane, or common ester interchange of a lower alkyl ester of said acid with said undecane.

In the phenolic type compound represented by the general formula (I), $R_1$ represents a methyl, ethyl or propyl group, but a methyl group is preferred in terms of a resistance to yellowing due to nitrogen oxide gases, sunlight, etc.

Such resistance is developed by adding the phenolic type compound in an amount of not less than 0.05% by weight, preferably not less than 0.2% by weight based on polyurethanes. Even if the amount exceeds 10% by weight, an effect enough to correspond to such increase in amount is difficult to obtain, which is disadvantageous economically.

By adding at least one member selected from benzotriazole type light stabilizers and hindered amine type ones in addition to the phenolic type compounds, the resulting polyurethane compositions exhibit a more superior resistance to yellowing due to not only sunlight but also nitrogen oxide gases.

Such benzotriazole type light stabilizer includes for example 2-(2-hydroxy-5-methylphenyl)benzotriazole, 2-(2-hydroxy-3-tert-butyl-5-methylphenyl)-5-chlorobenzotriazole, 2-(2-hydroxy-3,5-di-tertbutylphenyl)benzotriazole, 2-(2-hydroxy-5-tert-octylphenyl)benzotriazole, 2-(2-hydroxy-3,5-di-tert-amylphenyl)benzotriazole, 2-(2-hydroxy-3,5-di-tert-butylphenyl)-5-chlorobenzotriazole, 2-[2-hydroxy-3,5-bis-(α,α-dimethylbenzyl)phenyl]benzotriazole, etc. Of these, 2-(2-hydroxy-3,5-di-tert-amylphenyl)benzotriazole is preferred.

The hindered amine type light stabilizer includes for example bis(2,2,6,6-tetramethyl-4-piperidyl) sebacate, bis(1,2,2,6,6-pentamethyl-4-piperidyl) sebacate, polycondensation products of dimethyl succinate with 1-(2-hydroxyethyl)-4-hydroxy-2,2,6,6-tetramethylpiperidine, poly[[6-[(1,1,3,3-tetramethylbutyl)amino[-s-triazine-2,4-diyl[](2,2,6,6-tetramethyl-4piperidyl)imino]-hexamethylenev(2,2,6,6-tetramethyl-4-piperidyl-)imino]], 1-[2-[3-(3,5-di-tert-butyl-4-hydroxyphenyl)-propionyloxy]ethyl]-4-[3-(3,5-di-tert-butyl-4hydroxyphenyl)propionyloxy]-2,2,6,6-tetramethylpiperidine, bis(1,2,2,6,6-pentamethyl-4-piperidyl) 2-(3,5-di-tert-butyl-4-hydroxybenzyl)-2-n-butylmalonate, etc. Of these, bis(2,2,6,6,-tetramethyl-4-piperidyl) sebacate is preferred.

The amount of these light stabilizers added to polyurethanes is preferably not more than 10% by weight, and amounts more than that give no effect corresponding to such increase in amount. Also, the weight ratio of the phenolic type compound (I) to these light stabilizers is generally 1 to 0.2-5, preferably 1 to 0.5-2.

Polyurethanes used in the present invention are elastic high polymers having a urethane group in the molecule obtained by reacting a compound having a hydroxyl group at both terminals (e.g. polyesters, polylactones, polyethers, polyesteramides, polythioethers, polyhydrocarbons) or a mixture thereof with an organic diisocyanate in the presence of a polyfunctional hydrogen-containing chain-lengthening agent (e.g. hydrazines, polyhydrazides, polysemicarbazides, polyols, polyamines, hydroxylamine, water).

The polyurethane compositions of the present invention may contain, in addition to the foregoing stabilizers, other additives such as antioxidants, pigments, dyes, fillers and the like. Particularly, the heat and oxidation stability of the compositions can be improved by using antioxidants together, for example sulfur-containing compounds such as dilauryl thiodipropionate, distearyl thiodipropionate, pentaerythritol tetrakis(3-dodecylthiopropionate), 3,9-bis(2-dodecylthioethyl)-2,4,8,10-tetraoxaspiro[5.5]undecane, 3,9-bis[[2-(3-dodecylthioethyl)propionyloxy-1,1-dimethylethyl]-2,4,8,10-tetraoxaspiro[5.5]undecane, etc., and phosplite type compounds such as distearyl pentaerythritol diphosphite, tris(2,4-di-tert-butylphenyl)phosphite, tris(2-tert-butyl-4-methylphenyl)phosphite, bis(2,4-di-tert-butylphenyl) pentaerythritol diphosphite, tetrakis (2,4-di-tert-butylphenyl)-4,4'-biphenylene diphosphite and the like.

The foregoing various stabilizers and additives may be added at any step of the production of polyurethanes, but generally, they are added after formation of the polymer.

The present invention will be illustrated in detail with reference to the following examples, but it is not limited to these examples.

PREPARATION EXAMPLE 1

(Preparation of Compound I-1)

To a mixture of 30.2 g (0.121 mole) of methyl 3-(3-tertbutyl-4-hydroxy-5-methylphenyl)propionate and 15.3 g (0.0503 mole) of 3,9-bis(2-hydroxy-1,1-dimethylethyl)-2,4,8,10-tetraoxaspiro[5.5]-undecane was added 0.82 g (0.015 mole) of sodium methoxyide, and the mixture was heated. Reaction was carried out at 140° C. for 3 hours and then at 140° to 160° C. for 7 hours under reduced pressure of 50 mmHg.

After completion of reaction, the reaction product was dissolved in toluene and washed with aqueous dilute hydrochloric acid and then with water. Toluene was then removed by evaporation under reduced pressure to obtain 42.9 g of a crude product of 77% in purity. This product was purified by column chromatography on silica gel to obtain 24 g of 99%-purity 3,9-bis[2-[3-(3-tert-butyl-4-hydroxy-5-methylphenyl)propionyloxy]-1,1-dimethylethyl]-2,4,8,10-tetraoxaspiro[5.5]undecane as a colorless glassy product (Compound I-1). m.p., 45°-55° C.

| Elementary analysis (for $C_{43}H_{64}O_{10}$): | | |
|---|---|---|
| | C (%) | H (%) |
| Found | 69.61 | 8.98 |
| Calculated | 69.70 | 8.71 |

Mass analysis (FD-mass):
Molecular ion peak: 740
Proton NMR (CDCl$_3$/TMS):
δ(ppm) 0.92(s,12H), 1.40(s,18H), 2,21(s,6H), 2.7(m,8H), 3.4(m,8H), 3.93(s,4H), 4.17(s,2H), 4.67(broad s,2H), 6.85(broad s,2H), 6.96(broad s,2H).

PREPARATION EXAMPLE 2

(Preparation of Compound I-2)

Using a mixture of 33.6 g (0.121 mole) of methyl 3-(3-tertbutyl-4-hydroxy-5-isopropylphenyl)propionate, 15.3 g (0.0503 mole) of 3,9-bis(2-hydroxy-1,1-dimethylethyl)-2,4,8,10-tetraoxaspiro[5.5]-undecane and 0.82 g (0.015 mole) of sodium methoxide, reaction; aftertreatment and purification were carried out in the same manner as in Preparation example 1 to obtain 29 g of 98%-purity 3,9-bis[2-[3-(3-tert-butyl-4-hydroxy-5-isopropylphenyl)propionyloxy]-1,1-dimethylethyl]-2,4,8,10-tetraoxaspiro[5.5]undecane as a colorless glassy product (Compound I-2). m.p., 47°-57° C.

| Elementary analysis (for $C_{47}H_{72}O_{10}$): | | |
|---|---|---|
| | C (%) | H (%) |
| Found | 70.93 | 9.41 |
| Calculated | 70.82 | 9.10 |

Mass analysis (FD-mass):
Molecular ion peak: 796
Proton NMR: (CDCl$_3$/TMS): δ(ppm) 0.91(s,12H), 1.26(d,12H), 1.40(s,18H), 2.7(m,10H), 3.4(m,8H), 3.92(s.4H), 4.19(s,2H), 4.73(broad s,2H), 6.91(broad s,2H), 6.93(broad s,2H).

PREPARATION EXAMPLE 3

(Preparation of Compound AO-1)

Using a mixture of 35.3 g (0.121 mole) of methyl 3-(3,5di-tert-butyl-4-hydroxyphenyl)propionate, 15.3 g (0.0503 mole) of 3,9-bis(2-hydroxy-1,1-dimethylethyl)-2,4,8,10-tetraoxaspiro[5.5]-undecane and 0.82 g (0.015 mole) of sodium methoxide, reaction, aftertreatment and purification were carried out in the same manner as in Preparation example 1 to obtain 21 g of 99%-purity 3,9-bis[2-[3-(3,5-di-tert-butyl-4-hydroxyphenyl)propionyloxy]-1,1-dimethylethyl]-2,4,8,10-tetraoxaspiro[5.5undecane as a white crystal (Compound AO-1). m.p., 98°-100° C.

| Elementary analysis (for $C_{49}H_{76}O_{10}$): | | |
|---|---|---|
| | C (%) | H (%) |
| Found | 71.76 | 9.63 |
| Calculated | 71.33 | 9.28 |

Mass analysis (FD-mass):
Molecular ion peak 824
Proton NMR (CDCl$_3$/TMS):
δ(ppm) 0.91(s,12H), 1.42(s,36H), 2.7(m,8H), 3.4(m,8H), 3.93(s,4H), 4.21(s,2H), 5.05(broad s,2H), 6.97(broad s, 4H).

EXAMPLE 1

100 Parts by weight of polytetramethylene glycol having an average molecular weight of 1800 was reacted with 25 parts by weight of 4,4'-diphenylmethane diisocyanate at 85° C. for 2 hours with stirring to obtain an intermediate polymer. After cooling to room temperature, the intermediate polymer was dissolved in 200 parts by weight of dimethylformamide. The resulting solution was added to a separately prepared solution of 3 parts by weight of triethylenediamine in 100 parts by weight of dimethylformamide, and the mixed solution was stirred.

To the solution thus obtained were added the test compounds shown in Table 2, and after stirring, the solution was coated onto polyester film. Dimethylformamide was then removed in a dryer kept at 50° C. to obtain a sheet 1 mm thick.

According to "Testing Method for Color Fastness to Nitrogen Oxides" (JIS L 0855), a part of this sheet was exposed to atmospheres of varying concentrations, 650 ppm and 1300 ppm, of nitrogen oxide gases (hereinafter referred to as $NO_x$), and the $NO_x$ yellowing resistance was evaluated based on the degree of coloration after 30 minutes' exposure graded as follows:

1 yellowish brown
1.5 yellowish brown to yellow
2 yellow
2.5 yellow to pale yellow
3 pale yellow
3.5 pale yellow to very pale yellow
4 very pale yellow
4.5 very pale yellow to colorless
5 colorless The rest of the sheet was exposed to light in a fade meter (light source, ultraviolet carbon arc; and temperature of black panel, 63°±3° C.), and the light yellowing resistance was evaluated based on the degree of coloration after 35 hours' exposure graded in the same manner as above. The result is shown in Table 2.

In Table 2, the amount of the test compound is expressed by weight % based on polyurethane, and the symbols of the test compounds express the compounds described below.

TABLE 1

$$\left( A-CH_2CH_2-\overset{O}{\underset{\|}{C}}-O-CH_2-\underset{\underset{CH_3}{|}}{\overset{\overset{CH_3}{|}}{C}}-CH\underset{O-CH_2}{\overset{O-CH_2}{<}} \right)_2 C$$

| Compound No. | A |
|---|---|
| I-1 | 3-methyl-5-tert-butyl-4-hydroxyphenyl (CH₃, OH, C(CH₃)₃ substituted) |

TABLE 1-continued $$\left( A-CH_2CH_2-\overset{O}{\underset{\|}{C}}-O-CH_2-\underset{\underset{CH_3}{|}}{\overset{\overset{CH_3}{|}}{C}}-CH\underset{O-CH_2}{\overset{O-CH_2}{<}} \right)_2 C$$

| Compound No. | A |
|---|---|
| I-2 | 3-isopropyl-5-tert-butyl-4-hydroxyphenyl (CH(CH₃)₂, OH, C(CH₃)₃ substituted) |
| AO-1 | 3,5-di-tert-butyl-4-hydroxyphenyl (C(CH₃)₃, OH, C(CH₃)₃ substituted) |

AO-2: Pentaerythritol tetrakis[3-(3,5-di-tert-butyl-4-hydroxyphenyl)propionate]
AO-3 : 1,3,5-Tris(4-tert-butyl-3-hydroxy-2,6-dimethylbenzyl)-isocyanuric acid
UVA-1: 2-(2-Hydroxy-3,5-di-tert-amylphenyl)benzotriazole
UVA-2: 2-[2-Hydroxy-3,5-bis(α,α-dimethylbenzyl)phenyl]benzotriazole
HALS-1: Bis(2,2,6,6-tetramethyl-4-piperidyl) sebacate
HALS-2: Poly[[6- [(1,1,3,3-tetramethylbutyl)amino]-s-triazine-2,4-diyl][(2,2,6,6-tetramethyl-4-piperidyl)imino]hexamethylene[(2,2,6,6-tetramethyl-4-piperidyl)imino]]

TABLE 2

| Example | No. | Phenolic type Kind | Phenolic type Wt % | Benzotriazole type Kind | Benzotriazole type Wt % | Hindered amine type Kind | Hindered amine type Wt % | $NO_x$ yellowing resistance $NO_x$ 650 ppm | $NO_x$ yellowing resistance $NO_x$ 1300 ppm | Light yellowing resistance Fade meter (35 hours' exposure) |
|---|---|---|---|---|---|---|---|---|---|---|
| Present example | 1 | I-1 | 1.0 | — | — | — | — | 4 | 3.5 | 3.5 |
|  | 2 | I-2 | 1.0 | — | — | — | — | 3.5 | 3 | 3 |
|  | 3 | I-1 | 0.5 | UVA-1 | 0.5 | — | — | 4 | 3.5 | 4 |
|  | 4 | " | 1.0 | " | 0.5 | — | — | 4.5 | 4 | 4.5 |
|  | 5 | " | 0.5 | " | 1.0 | — | — | 4 | 3.5 | 4 |
|  | 6 | " | 0.5 | UVA-2 | 0.5 | — | — | 4 | 3.5 | 4 |
|  | 7 | " | 1.0 | " | 0.5 | — | — | 4.5 | 4 | 4.5 |
|  | 8 | I-2 | 0.5 | UVA-1 | 0.5 | — | — | 3.5 | 3 | 3.5 |
|  | 9 | " | 0.5 | UVA-2 | 0.5 | — | — | 3.5 | 3 | 3.5 |
|  | 10 | I-1 | 0.5 | — | — | HALS-1 | 0.5 | 4.5 | 4 | 4.5 |
|  | 11 | " | 1.0 | — | — | " | 0.5 | 5 | 4.5 | 5 |
|  | 12 | " | 0.5 | — | — | " | 1.0 | 4.5 | 4 | 4.5 |
|  | 13 | " | 0.5 | — | — | HALS-2 | 0.5 | 4.5 | 4 | 4 |
|  | 14 | " | 1.0 | — | — | " | 0.5 | 5 | 4.5 | 4.5 |
|  | 15 | I-2 | 0.5 | | | HALS-1 | 0.5 | 4 | 3.5 | 4 |
|  | 16 | " | 0.5 | | | HALS-2 | 0.5 | 4 | 3.5 | 3.5 |
|  | 17 | I-1 | 0.5 | UVA-1 | 0.25 | HALS-1 | 0.25 | 4.5 | 4 | 4.5 |
|  | 18 | " | 0.5 | UVA-1 | 0.25 | HALS-2 | 0.25 | 4.5 | 4 | 4.5 |
|  | 19 | I-1 | 0.5 | UVA-2 | 0.25 | HALS-1 | 0.25 | 4.5 | 4 | 4.5 |
|  | 20 | " | 0.5 | " | 0.25 | HALS-2 | 0.25 | 4.5 | 4 | 4 |
|  | 21 | I-2 | 0.5 | UVA-1 | 0.25 | HALS-1 | 0.25 | 4 | 3.5 | 4 |
|  | 22 | " | 0.5 | " | 0.25 | HALS-2 | 0.25 | 4 | 3.5 | 3.5 |
|  | 23 | " | 0.5 | UVA-2 | 0.25 | HALS-1 | 0.25 | 4 | 3.5 | 4 |
| Compar- | 24 | AO-1 | 1.0 | — | — | — | — | 2.5 | 2.5 | 1 |

TABLE 2-continued

| Example | No. | Phenolic type Kind | Wt % | Benzotriazole type Kind | Wt % | Hindered amine type Kind | Wt % | $NO_x$ yellowing resistance $NO_x$ 650 ppm | $NO_x$ 1300 ppm | Light yellowing resistance Fade meter (35 hours' exposure) |
|---|---|---|---|---|---|---|---|---|---|---|
| ative example | 25 | AO-2 | 1.0 | — | — | — | — | 3 | 2.5 | 1.5 |
| | 26 | AO-3 | 1.0 | — | — | — | — | 3 | 2.5 | 1.5 |
| | 27 | AO-1 | 1.0 | UVA-1 | 0.5 | — | — | 1.5 | 1 | 2.5 |
| | 28 | AO-2 | 1.0 | UVA-1 | 0.5 | — | — | 2 | 1.5 | 3 |
| | 29 | AO-3 | 1.0 | " | 0.5 | — | — | 2.5 | 2 | 3.5 |
| | 30 | " | 1.0 | UVA-2 | 0.5 | — | — | 2.5 | 2 | 3 |
| | 31 | AO-1 | 1.0 | — | — | HALS-1 | 0.5 | 2 | 1.5 | 3.5 |
| | 32 | AO-2 | 1.0 | — | — | " | 0.5 | 2.5 | 2 | 3.5 |
| | 33 | AO-3 | 1.0 | — | — | " | 0.5 | 2.5 | 2 | 3.5 |
| | 34 | " | 1.0 | — | — | HALS-2 | 0.5 | 2.5 | 2 | 3.5 |
| | 35 | AO-1 | 0.5 | UVA-1 | 0.25 | HALS-1 | 0.25 | 2 | 1.5 | 3 |
| | 36 | AO-2 | 0.5 | " | 0.25 | " | 0.25 | 2 | 1.5 | 3 |
| | 37 | AO-3 | 0.5 | UVA-1 | 0.25 | HALS-1 | 0.25 | 2.5 | 2 | 3.5 |
| | 38 | " | 0.5 | " | 0.25 | HALS-2 | 0.25 | 2.5 | 2 | 3.5 |
| | 39 | " | 0.5 | UVA-2 | 0.25 | HALS-1 | 0.25 | 2.5 | 2 | 3.5 |
| | 40 | " | 0.5 | " | 0.25 | HALS-2 | 0.25 | 2.5 | 2 | 3 |
| | 41 | — | — | — | — | — | — | 2 | 1.5 | 1 |

What is claimed is:

1. A polyurethane composition which comprises a polyurethane having incorporated therein a phenolic type compound represented by the general formula (I),

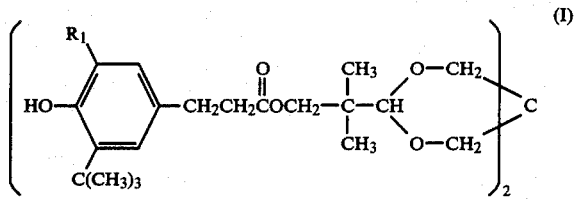

wherein $R_1$ represents a $C_1$–$C_3$ alkyl group, in an amount of 0.05 to 10% by weight based on the polyurethane and at least one member selected from a benzotriazole type light stabilizer and a hindered amine type stabilizer in an amount of 0 to 10% by weight based on the polyurethane.

2. A polyurethane compostion as claimed in claim 1 wherein the weight ratio of the phenolic type compound and the light stabilizer(s) is 1 to 0.2-5.

3. A polyurethane composition as claimed in claim 1 wherein the benzotriazole type light stabilizer is selected from 2-(2-hydroxy-3,5-di-tert amylphenyl)benzotriazole and 2-[2-hydroxy-3,5-bis(α,α-dimethylbenzyl)-phenyl]benzotriazole.

4. A polyurethane composition as claimed in claim 1 wherein the hindered amine type stabilizer is selected from bis (2,2,6,6-tetramethyl-4-piperidyl)sebacate and poly [[6-[(1,1,3,3-tetramethylbutyl)amino]-s-triazin-2,4-diyl][(2,2, 6,6-tetramethyl-4-piperidyl)imino]hexamethylene[(2,2,6,6-tetramethyl-4-piperidyl)imino]].

* * * * *